United States Patent [19]
Han et al.

[11] Patent Number: 6,118,489
[45] Date of Patent: Sep. 12, 2000

[54] DEINTERLACING DEVICE AND METHOD FOR DIGITAL TV RECEIVER

[75] Inventors: Dongil Han; Chang Yong Shin, both of Seoul, Rep. of Korea

[73] Assignee: LG Electronics, Inc., Seoul, Rep. of Korea

[21] Appl. No.: 09/224,049

[22] Filed: Dec. 31, 1998

[30] Foreign Application Priority Data

Dec. 31, 1997 [KR] Rep. of Korea ..................... 97-80719

[51] Int. Cl.[7] .................................................. H04N 7/01
[52] U.S. Cl. .......................................... 348/452; 348/452
[58] Field of Search ................................... 348/452, 448, 348/458, 700; 382/224, 236, 299, 300

[56] References Cited

U.S. PATENT DOCUMENTS

| | | | |
|---|---|---|---|
| 5,027,201 | 6/1991 | Bernard . | |
| 5,339,109 | 8/1994 | Hong | 348/448 |
| 5,386,237 | 1/1995 | Knee | 348/448 |
| 5,475,438 | 12/1995 | Bretl | 348/448 |
| 5,619,271 | 4/1997 | Mancuso et al. | 348/448 |
| 5,796,437 | 8/1998 | Muraji et al. | 348/452 |
| 5,825,429 | 10/1998 | Shirahata | 348/448 |
| 5,852,470 | 12/1998 | Kondo et al. | 348/448 |
| 5,929,918 | 7/1999 | Marques Periera et al. | 348/448 |

*Primary Examiner*—Victor R. Kostak

[57] ABSTRACT

The device includes a data storage unit for storing a video signal in three field data units, a first pattern detecting unit for detecting a pattern of a data level of at least one pixel value in first field data, and a second pattern detecting unit for detecting a pattern of a data level of at least one pixel value in third field data, which is two fields prior to the first field data. The pixel in the third field data corresponding to the pixel value in the first field data. A difference signal detecting unit obtains a difference signal between the pixel in the first field data and the pixel in the third field data, and a difference signal between the patterns detected in the first pattern detecting unit and the second pattern detecting unit. A motion signal generating unit obtains a motion extent signal used to interpolate a pixel in the second field data based on the difference signals detected in the difference signal detecting unit.

27 Claims, 10 Drawing Sheets

DEINTERLACING DEVICE AND METHOD FOR DIGITAL TV RECEIVER

BACKGROUND OF THE INVENTION

1. Field of the Invention

The present invention relates to a digital TV receiver, and more particularly, to a deinterlacing device and method for a digital TV receiver, which can convert an interlaced scanning video present in an NTSC video or a DTV format into a progressive scanning video.

2. Background of the Related Art

As is well-known, the current NTSC TV system employs interlaced scanning video, VGA and the like employ progressive scanning video. Conversion from progressive scanning video to interlaced scanning video is easy. However, conversion from interlaced scanning video to progressive scanning video is difficult. In general, the deinterlacing device used for converting interlaced scanning video into progressive scanning video fills in vacant pixels in a field to provide a perfect frame. The digital TV receiver, currently spot lighted, supports display of a frame data of progressive scanning video. Therefore, if a video information source provides interlaced scanning field data, the data should be deinterlaced before conversion into a progressive scanning frame data.

In the deinterlacing process for filling in vacant pixels in a field to provide a perfect frame, there exists a non-motion compensation inter-field interpolation method, in which right prior field information is inserted between the present field information lines; a line doubling method, in which line field information of the present field itself is used repeatedly; and an intra-field interpolation method, in which a linear line interpolation of the present field itself is used. These methods are advantageous in that they requires simple hardware for implementation. On the contrary, the line doubling method shows a serious overall picture quality degradation, the non-motion compensation inter-field interpolation method shows substantial degradation of picture quality after interpolation for portions with motion, and the intra-field interpolation method shows substantial degradation of picture quality after interpolation for portions without motion. In the method for converting interlaced scanning information into progressive scanning information, there are methods suggested by Bernard (U.S. Pat. No. 5,027,201) and Faroudja (U.S. Pat. No. 5,194,451). Though these methods can provide excellent picture quality, the methods have problems in that the receiver costs are high because the methods require a large sized memory and the process is complicated.

SUMMARY OF THE INVENTION

Accordingly, the present invention is directed to a deinterlacing device and method for a digital TV receiver that substantially obviates one or more of the problems due to limitations and disadvantages of the related art.

An object of the present invention is to provide a deinterlacing device and method for a digital TV receiver that provide a good quality picture with good economy by means of simple hardware.

Another object of the present invention is to provide a digital TV receiver, which can provide a good quality picture with good economy.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in the deinterlacing device and method for a digital TV receiver, there is a memory unit for storing at least two fields of data in a video signal. A pattern of at least one data level of a first field data, which is the present field data, is detected, and a pattern of a data level of at least one pixel value in the third field data, which is two field prior the first field data and corresponds to the at least one pixel value in the first field data, is detected. Then, a difference signal of the at least one pixel value in the first field data and the at least on pixel value in the third field data is obtained, and a difference signal of patterns of the first and third field data is obtained. Then, a motion signal is obtained using a difference signal of the pixel values and a difference signal of the patterns.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
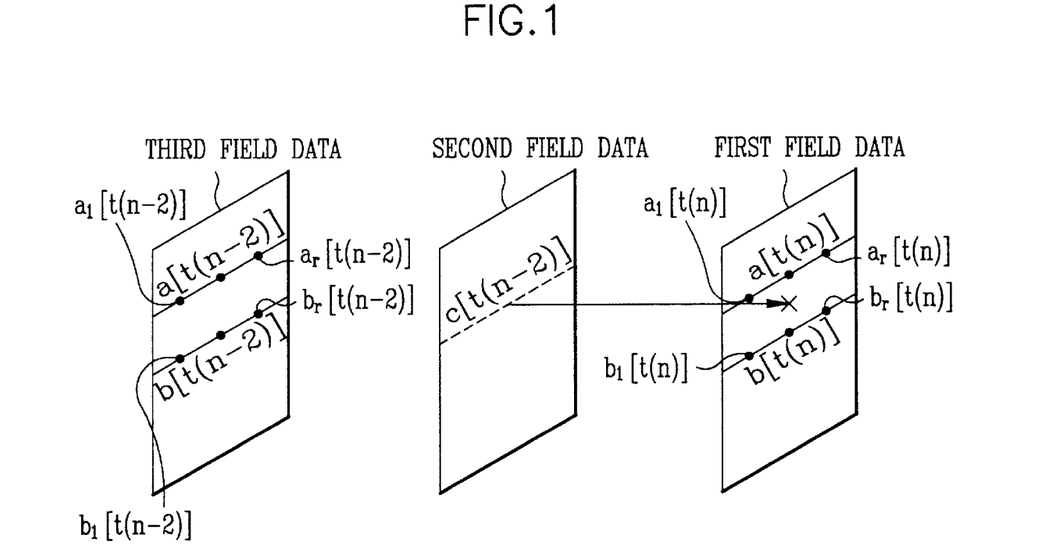
FIG. 1 illustrates the steps of a process for obtaining an interpolated value of interpolation pixels in accordance with a preferred embodiment of the present invention.

Reference will now be made in detail to the preferred embodiments of the present invention, examples of which are illustrated in the accompanying drawings. FIG. 1 illustrates the steps of a process for obtaining an interpolated value of interpolation pixels in accordance with a preferred embodiment of the present invention.

Referring to FIG. 1, the steps of the process for obtaining an interpolated value of interpolation pixels in accordance with a preferred embodiment of the present invention starts with detecting patterns of data levels of (1) one pixel value a[t(n)] (hereafter called "a first pixel value") on an arbitrary line (hereafter called "a first line") in first field data and peripheral pixels al[t(n)], ar[t(n)] thereof and (2) one pixel value b[t(n)] (hereafter called "a second pixel value") on another arbitrary line (hereafter called "a second line") in the first field data and peripheral pixels bl[t(n)], br[t(n)] thereof. Then, patterns of data levels of (1) one pixel value a[t(n−2)] (hereafter called "a first pixel value") on an arbitrary line (hereafter called "a first line") in third field data and peripheral pixels al[t(n−2)], ar[t(n−2)] thereof and (2) one pixel value b[t(n−2)] (hereafter called "a second pixel value") on another arbitrary line (hereafter called "a second line") in the third field data and peripheral pixels bl[t(n−2)], br[t(n−2)] thereof are detected. The third field data differing temporally by two fields from the first field data (n represents a field time or field presentation time).

A first difference signal is obtained on the pattern of data levels of the first pixel value a[t(n)] in the first field data and peripheral pixels al[t(n)], ar[t(n)] thereof and the pattern of data levels of the first pixel value a[t(n−2)] in the third field data and peripheral pixels al[t(n−2)], ar[t(n−2)] thereof. A second difference signal is obtained on the pattern of data levels of the second pixel value b[t(n)] in the first field data and peripheral pixels bl[t(n)], br[t(n)] thereof and the pattern of data levels of the first pixel value a[t(n−2)] in the third field data and peripheral pixels bl[t(n−2)], br[t(n−2)] thereof. A third difference signal on the first pixel value a[t(n)] in the first field data and the first pixel value a[t(n−2)] in the third field data is obtained, and a fourth difference signal on the second pixel value b[t(n)] in the first field data and the second pixel value b[t(n−2)] in the third field data is obtained. These difference signals are used in determining a motion signal and to obtain an interpolation value of an interpolation pixel.

Figure 2A:
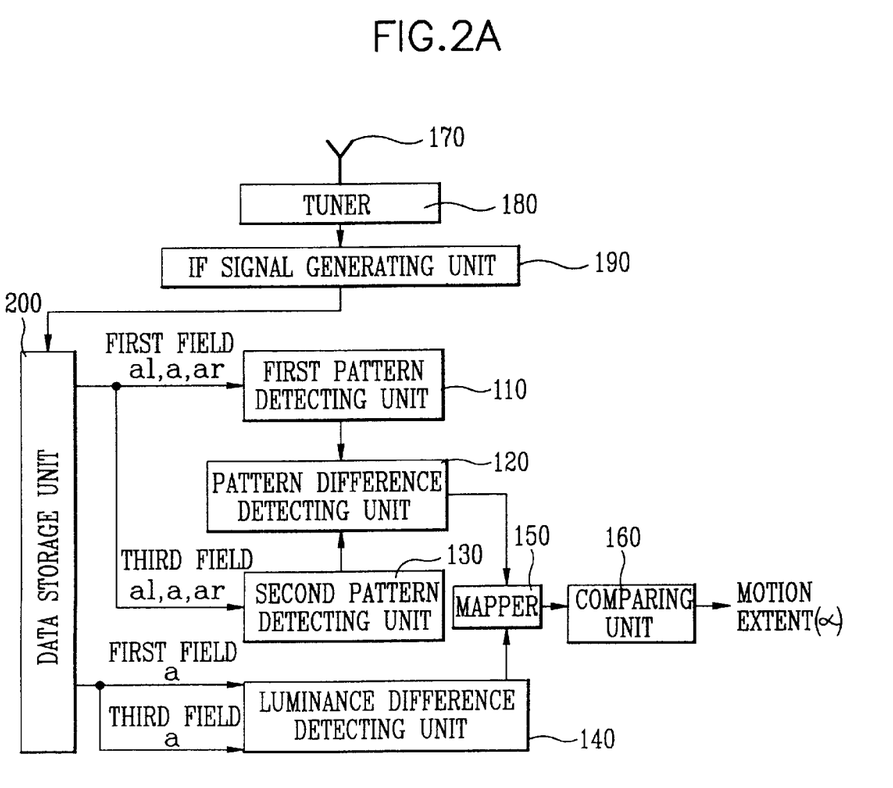
FIG. 2A illustrates a block diagram showing a system for processing digital video in accordance with a first preferred embodiment of the present invention.
Figure 2B:
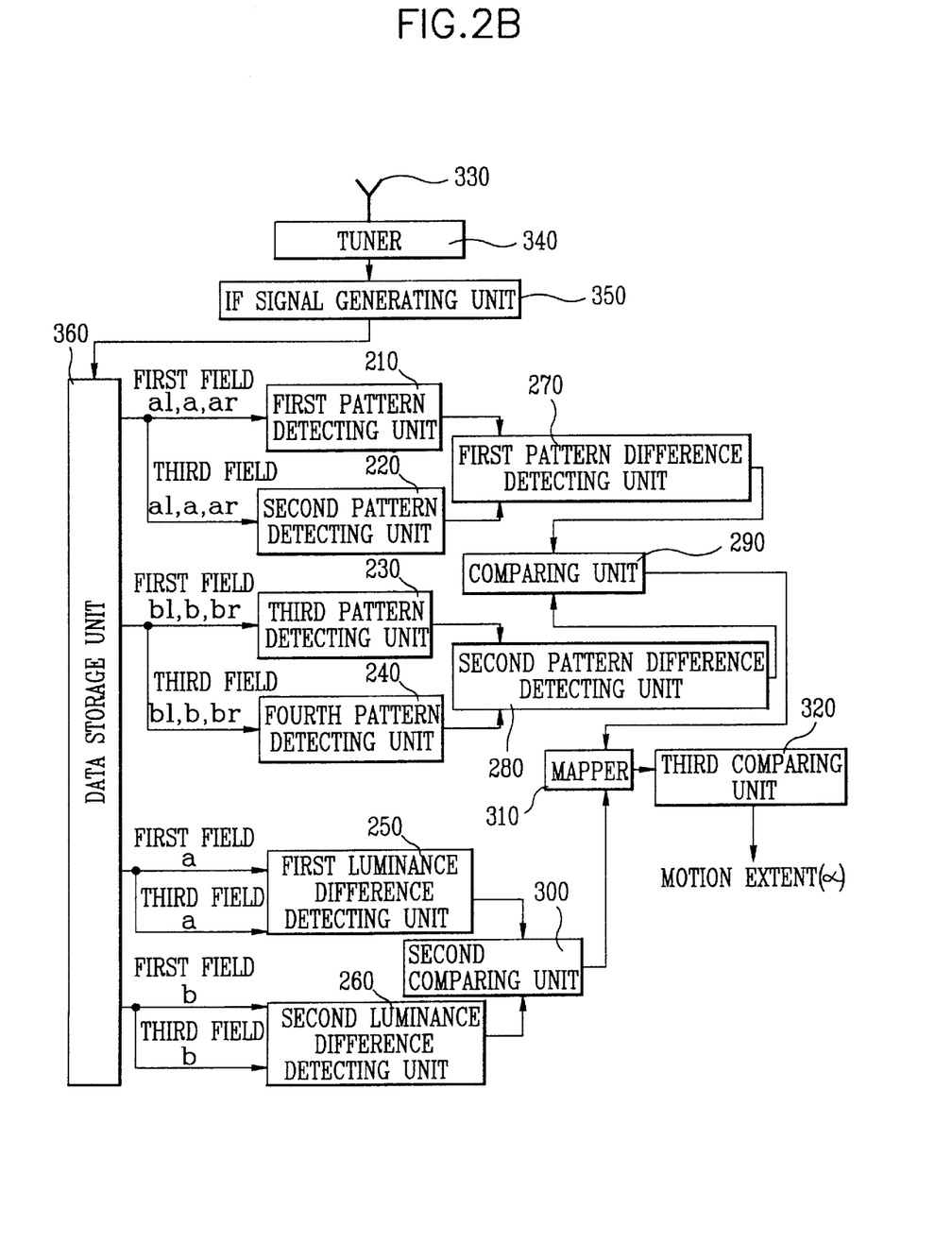
FIG. 2B illustrates a block diagram showing a system for processing digital video in accordance with a second preferred embodiment of the present invention.

FIGS. 2A and 2B each illustrate block diagrams showing a system for processing a digital video in accordance with a preferred embodiment of the present invention.

Referring to FIG. 2A, in which pixel values on only one line in field data is used, the device includes a first pattern detecting unit 110 for detecting a luminance profile pattern using a first pixel value "a" on a first line in first field data and peripheral pixel values thereof (i.e., pixel values to the right "ar" and left "al" of the first pixel value), a second pattern detecting unit 130 for detecting a luminance profile pattern using a first pixel value "a" in third field data and pixel values at right "ar" and left "al" thereof, a pattern difference detecting unit 120 for obtaining a pattern difference signal between luminance profile patterns detected in the first pattern detecting unit 110 and the second pattern detecting unit 130, a luminance difference detecting unit 140 for obtaining a luminance difference signal between luminances on the first pixel value in the first field data and the first pixel value in the third field data, a mapper 150 for respectively mapping the luminance difference signal and the pattern difference signal, and a comparator 160 for comparing the difference signals from the mapper 150 and selecting a greater value as a motion signal α of an interpolation pixel.

Figure 3:
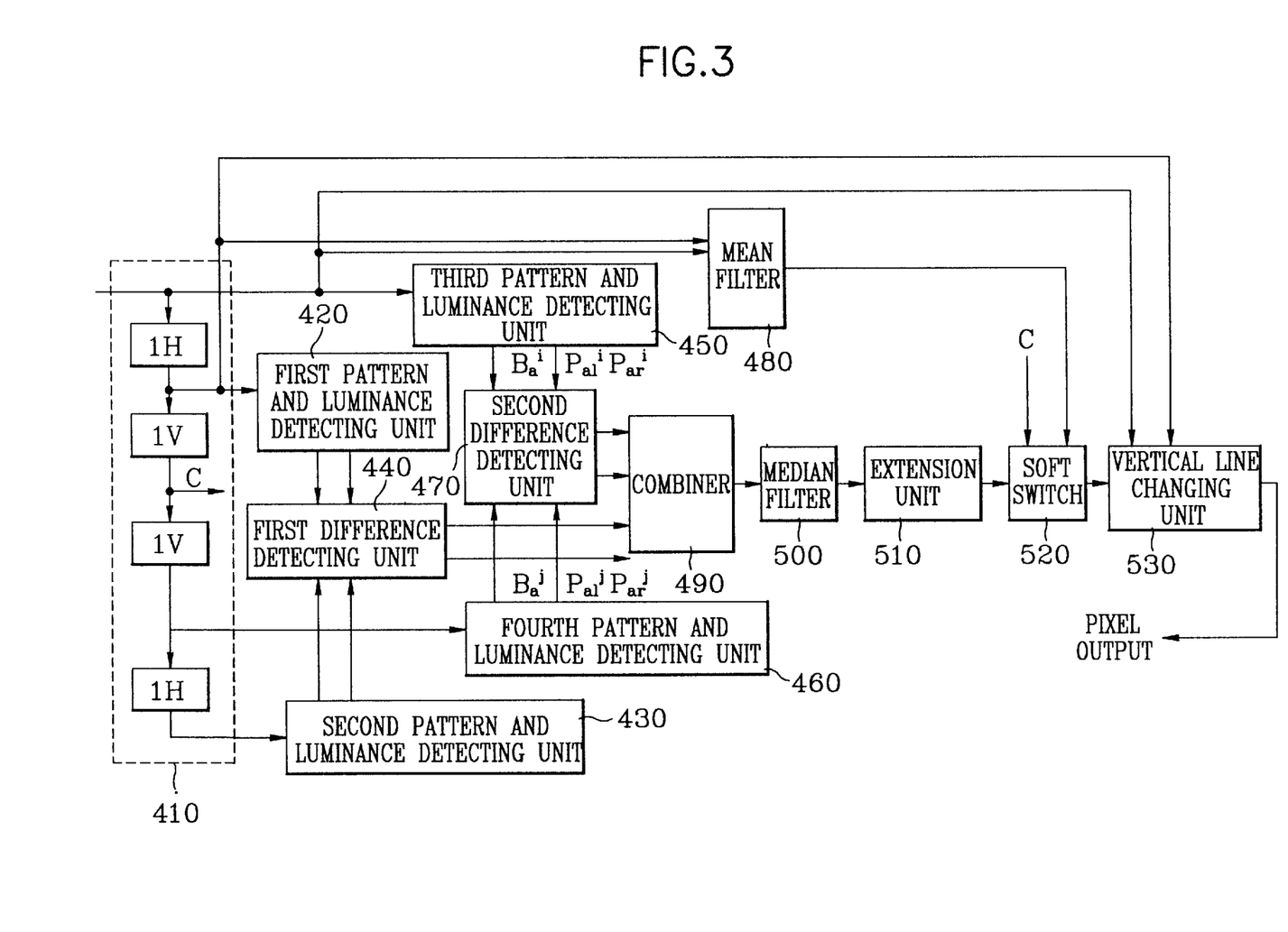
FIG. 3 illustrates a detail block diagram of the device in FIG. 2B.
Figure 4A:
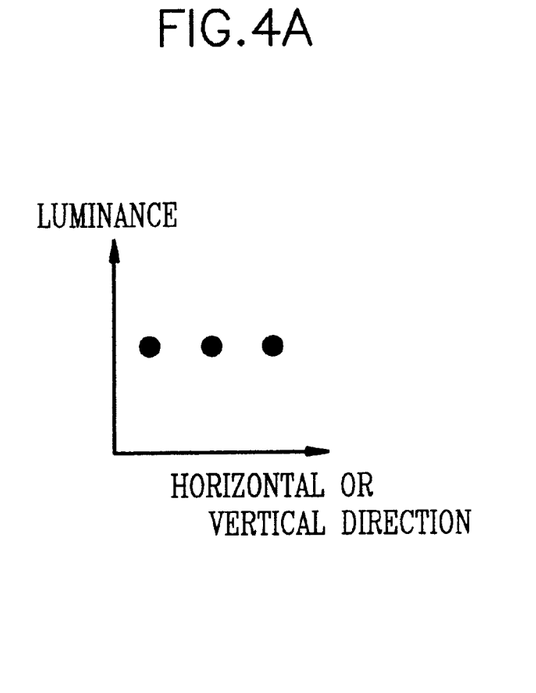
FIGS. 4A–4M illustrate diagrams showing various examples of luminance profile patterns.
Figure 4B:
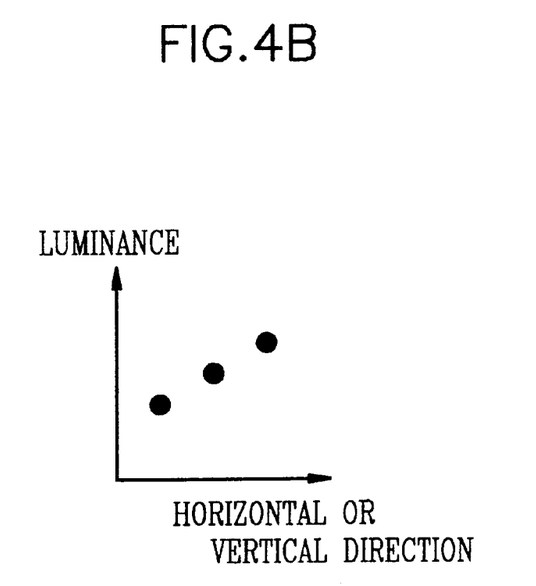
Figure 4C:
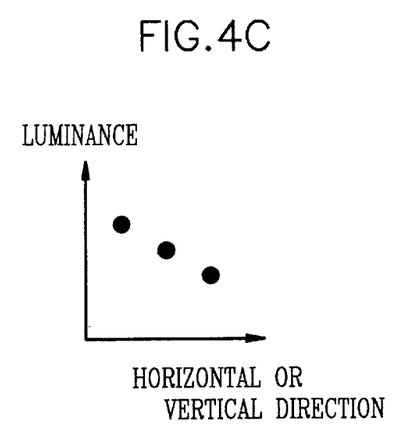
Figure 4D:
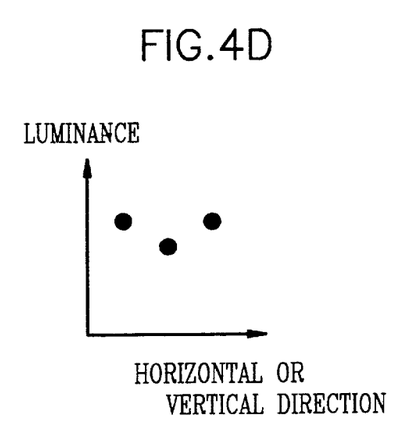
Figure 4E:
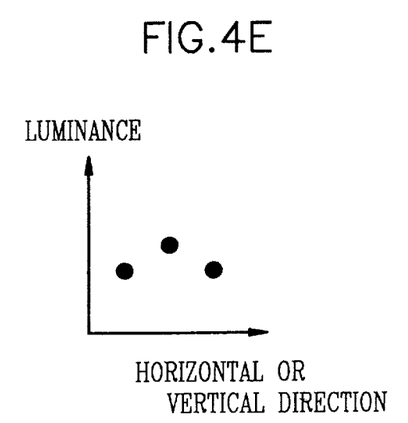
Figure 4F:
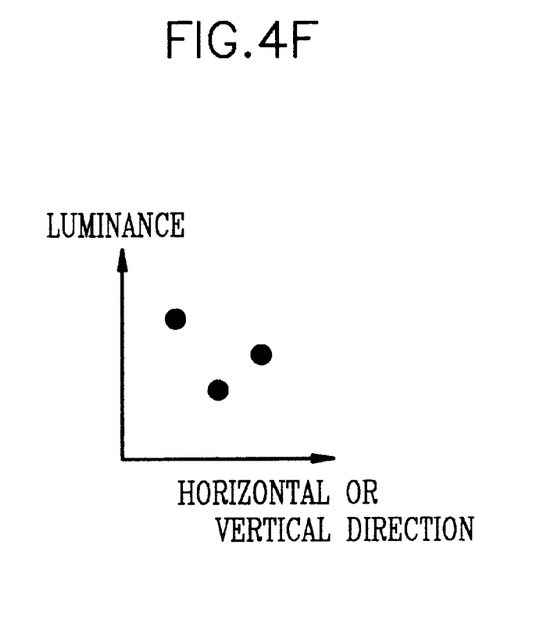
Figure 4G:
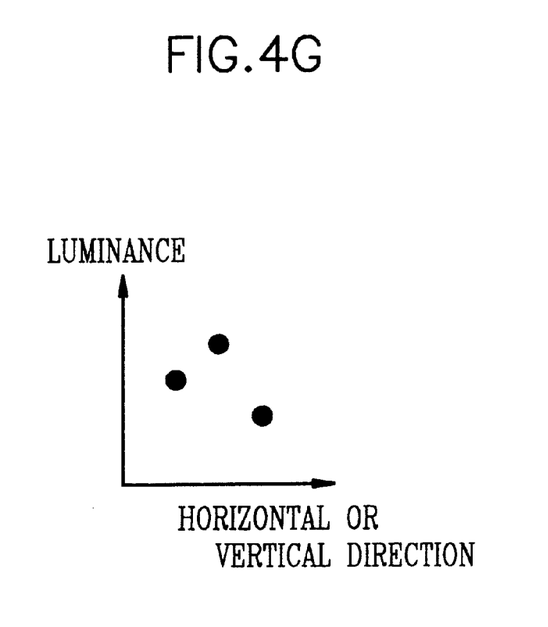
Figure 4H:
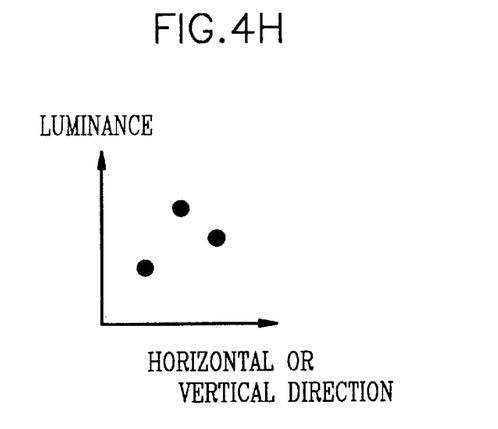
Figure 4I:
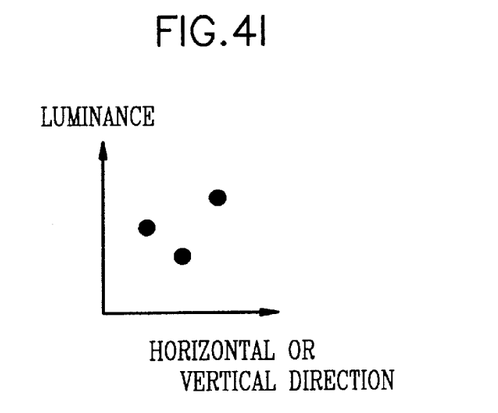
Figure 4J:
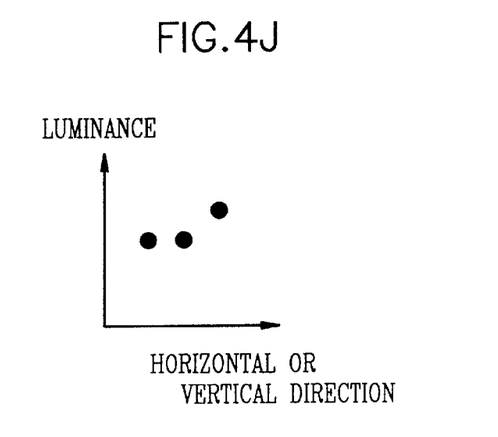
Figure 4K:
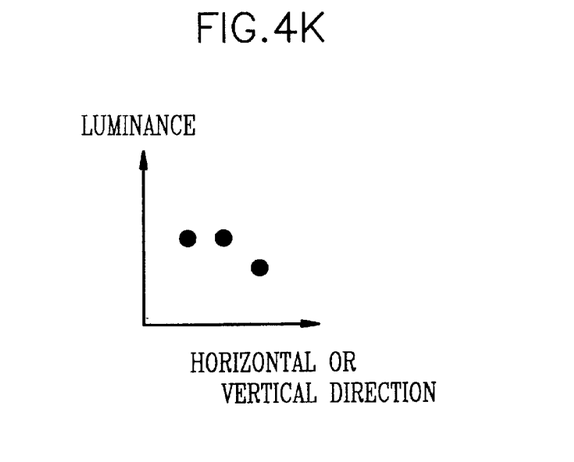
Figure 4L:
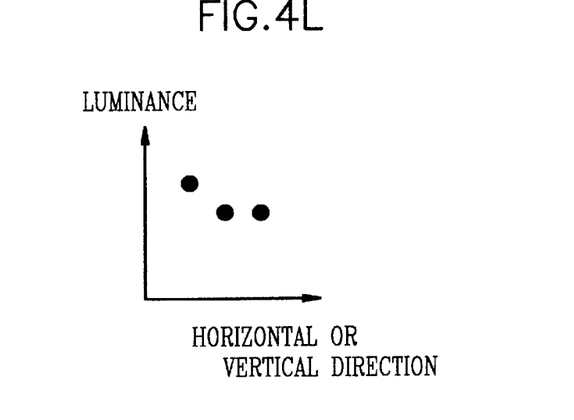
Figure 4M:
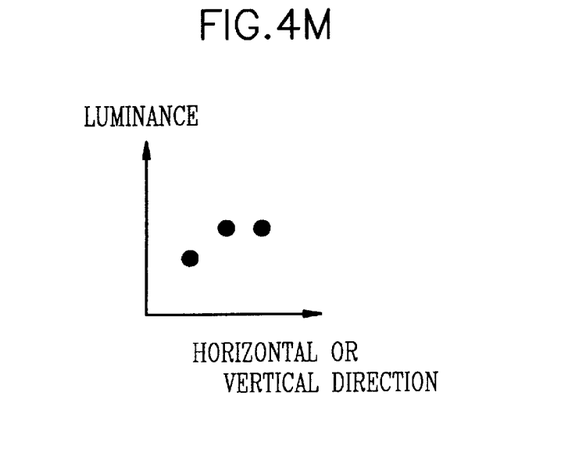

The first and second pattern detecting units 110 and 130 operate according to equations (1) and (2) discussed in detail below with respect to the embodiment of FIG. 3, and the pattern difference detecting unit 120 and the luminance difference detecting unit 140 operate according to equations (3) and (4), respectively, discussed in detail below with respect to the embodiment of FIG. 3.

In FIG. 2A, reference numeral 170 denotes an antenna for receiving video signals, reference numeral 180 denotes a tuner for synchronizing a desired channel signal only from the received video signals, reference numeral 190 denotes an IF signal generating unit for generating an intermediate frequency signal of the synchronized channel signal, and reference numeral 200 denotes a data storage unit for storing the intermediate frequency signal in units of three fields of data. The data storage unit 200 has a plurality of line memories.

Referring to FIG. 2B, showing, as an example, a case when two line pixel values in field data are used, the device includes a first pattern detecting unit 210 for detecting a luminance profile pattern using a first pixel value "a" on the first line in first field data and pixel values on the right "ar" and left "al" thereof, a second pattern detecting unit 220 for detecting a luminance profile pattern using a first pixel value "a" on a first line in third field data and pixel values on the right "ar" and left "al" thereof, a first pattern difference detecting unit 270 for detecting a difference signal (an absolute value of a difference of signals) between the luminance profile patterns detected in the first pattern detecting unit 210 and the second pattern detecting unit 220, a third pattern detecting unit 230 for detecting a luminance profile pattern using a second pixel value "b" on a second line in the first field data and pixel values on the right "br" and left "bl" thereof, a fourth pattern detecting unit 240 for detecting a luminance profile pattern using a second pixel value "b" on a second line in the third field data and pixel values on the right "br" and left "bl" thereof, a second pattern difference detecting unit 280 for detecting a difference signal between the luminance profile patterns detected in the third pattern detecting unit 230 and the fourth pattern detecting unit 240, a first comparing unit 290 for comparing values from the first pattern difference detecting unit 270 and the second pattern difference detecting unit 280 and selecting a greater value, a first luminance difference detecting unit 250 for detecting a difference of luminances between the first pixel values on the first lines in the first field data and the third field data, a second luminance difference detecting unit 260 for detecting a luminance difference between the second pixel values on second lines in the first field data and the third field data, a second comparing unit 300 for comparing values from the first luminance difference detecting unit 250 and the second luminance detecting unit 260 and selecting a greater value, a mapper 310 for respectively mapping the values from the first comparing unit 290 and the second comparing unit 300, and a third comparing unit 320 for comparing values mapped in the mapper 310 and selecting a greater value as a signal of an extent of motion.

The first–fourth pattern detecting units 210, 220, 230 and 240 operate according to equations (1) and (2) discussed in detail below with respect to the embodiment of FIG. 3. The first and second pattern difference detecting unit 270 and 280 operate according to equation (3) discussed in detail below with respect to the embodiment of FIG. 3. The first and second luminance difference detecting units 250 and 260 operate according to equation (4) discussed in detail below with respect to the embodiment of FIG. 3.

In FIG. 2B, unexplained reference numeral 330 denotes antenna, 340 denotes a tuner, 350 denotes an IF signal generating unit, and 360 denotes a data storage unit functioning in the same manner described above with respect to the antenna 170, the tuner 180, the IF signal generating unit 190 and the data storage unit 200, respectively.

As explained, in a case of the deinterlacing device using one line, a luminance difference value on pixel values in the first field data and the third field data and a pattern difference value on luminance profiles of pixel values in the first field data and the third field data are calculated and mapped. Greater values of the mapped values are used in calculating an extent of motion. And, in a case of the deinterlacing device using two lines, respective greater values of the luminance difference values and difference values of the luminance profile patterns obtained in each line in the field data are mapped, and a greater value of the mapped values is used in the calculation of an extent of motion. In order to predict an extent of motion more precisely, a median filter unit may be used. Noise components may be entrained into a motion signal of a determined interpolation pixel in encoding or transmission of video information. Therefore, the median filter unit removes the noise components which can be entrained in the calculation of a luminance difference value and a luminance profile pattern difference value, groups portions with motion, and smoothes the motion signal. An extension unit may also be added next to the median filter unit. The extension unit extends the grouped portions with motion to peripheral pixels to determine an extent of motion. Moreover, the aforementioned deinterlacing devices store a video signal in at least two field data units (as discussed below). Deinterlacing is conducted in three field data units starting from the present field data (i.e., the first field data) to the third field data, two field data before the first field data. That is, by using a device like a simple field memory and simple processing using a pixel luminance difference value and a pixel luminance profile pattern difference, an extent of motion can be obtained in a simple manner. By using the extent of motion, an interpolation value of an interpolation pixel can be determined. Accordingly, the deinterlacing device is possible using simple hardware.

Another embodiment of the deinterlacing device for a digital TV receiver of the present invention will be explained with reference to the attached drawings. FIG. 3 illustrates a block diagram for explaining an embodiment of the deinterlacing device of the present invention. As shown, the device includes a field data storage unit 410 for storing second field data, one field prior to the first field data (i.e., the present field data); and third field data, two field data prior to the first field data. Accordingly, instead of having the capacity to store three fields of data, the field storage units in the present invention may have the capacity to store only two fields of data. The device further includes a first pattern and luminance detecting unit 420 for receiving data on a line one line prior to the present line from the field data storage unit 410 and detecting a luminance profile pattern and a luminance; a second pattern and luminance detecting unit 430 for receiving a data on a line one line prior to a line in the third field data having a spatial position identical to the present line from the field data storage unit 410 and detecting a luminance profile pattern and a luminance; a first difference detecting unit 440 for obtaining respective differences between the luminance profile patterns and the luminances from the first pattern and luminance detecting unit 420 and the second pattern and luminance detecting unit 430; a third pattern and luminance detecting unit 450 for receiving the present line data in the first field data and detecting a luminance profile pattern and a luminance; a fourth pattern and luminance detecting unit 460 for receiving data on a line in the third field data having a spatial position identical to the data on the present line from the field data storage unit 410 and detecting a luminance profile pattern and a luminance; a second difference detecting unit 470 for obtaining differences of the luminance profile patterns and the luminances from the third pattern and luminance detecting unit 450 and the fourth pattern and luminance detecting unit 460; a mean filter 480 for providing a mean of pixel values at positions both on an upper side and lower side of the pixel value at the position to be interpolated; a combiner 490 for selecting greater values from the luminance profile pattern differences and the luminance differences from the first difference detecting unit 440 and the second difference detecting unit 470, respectively, mapping the selected values, and selecting a greater value from the mapped values; a median filter 500 for removing noise from the value from the combiner 490, grouping portions with motion and smoothing the motion signal; an extension unit 510 for extending the portions with motion in the grouped pixels having the noise removed therefrom in the median filter 500 to adjacent pixels; a soft switch 520 for mixing the pixel value at a position to be interpolated presently in the second field data and a value from the mean filter 480 according to the extent of motion from the extension unit 510; and a vertical line changing unit 530 for changing a number of vertical lines using line data of the present field from the field data storage unit 410 and the interpolated line data from the soft switch 520.

The steps of a deinterlacing process according to the aforementioned deinterlacing device will be explained with reference to FIGS. 4A–6. The field data storage unit 410 is a memory having a size capable of storing a total of two fields of data; namely, the two past fields of data with reference to the present field data (a second field data and a third field data, respectively).

The first pattern and luminance detecting unit 420 and the second pattern and luminance detecting unit 430 respectively obtain luminance profile patterns and luminances using line data one line prior to the present line data in the first field data and line data in the third field data at a spatial position identical to the aforementioned line data in the first field data. The first difference detecting unit 440 obtains difference signals of the luminance profile patterns and the luminances respectively detected by the first pattern and luminance detecting unit 420 and the second pattern and luminance detecting unit 430. The third pattern and luminance detecting unit 450 and the fourth pattern and luminance detecting unit 460 respectively detect luminance profile patterns and luminances using the present line data in the first field data and line data at a spatial position identical to the present line data in the third field data. The second difference detecting unit 470 obtains differences of the luminance profile patterns and the luminances respectively obtained in the third pattern and luminance detecting unit 450 and in the fourth pattern and luminance detecting unit 460.

For example, the aforementioned luminance profile pattern is based on luminances of three pixel values, which may be represented in five cases as shown in FIGS. 4A–4E and 5A; however, there may be up to thirteen patterns as shown in FIGS. 4A–4M. The number and type of patterns used are freely selectable by the system designer based on the desired results and the application. The concept of the luminance profile pattern can also be extended to cases with more than three pixels.

Figure 5A:
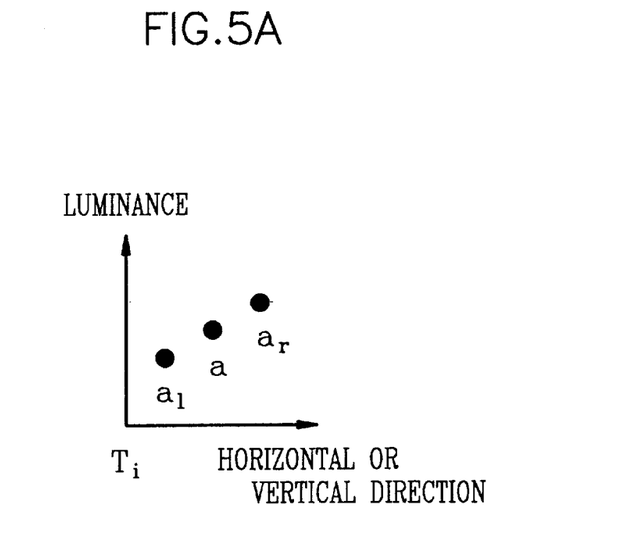
FIG. 5A illustrates a diagram showing an example of a luminance profile pattern.
Figure 5B:
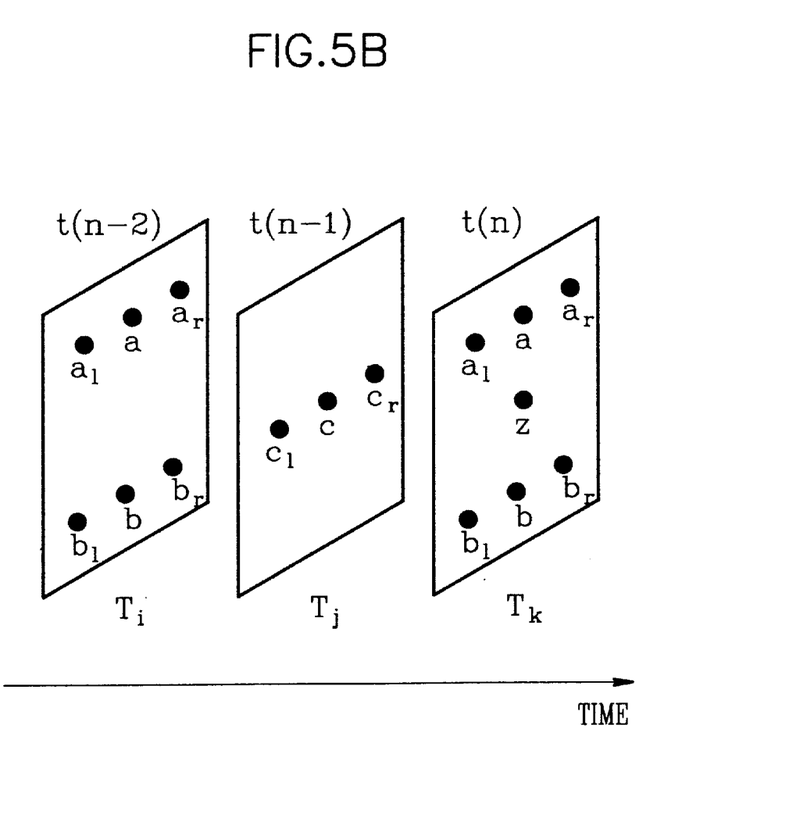
FIG. 5B illustrates a diagram showing a layout of pixels taken into account in obtaining a luminance profile pattern according to the present invention; and, FIG. 6 illustrates the steps of a process for obtaining a difference of luminance profile patterns and a difference of luminances according to the present invention.

For purposes of discussion only, the invention will be described for the luminance profile pattern as shown in FIG.

5B. Assume that the luminances of pixels al, a, and ar in FIG. 5B at a time Ti are $Bal^i$, $Ba^i$ and $Bar^i$, respectively, then the luminance profile pattern can be quantitatively expressed as equations (1) and (2) below.

$$Pal^i = Ba^i - Bal^i \quad (1)$$

$$Par^i = Ba^i - Bar^i \quad (2)$$

Quantifying the luminance profile patterns of many required lines are conducted. For example, the aforementioned quantifying process on the luminance profile patterns is conducted based on pixel values over three fields as shown in FIG. 5B.

The first and second difference detecting units 440 and 470 calculate difference values of the luminance profile patterns and difference values of the luminances output from the first–fourth pattern and luminance detecting units 420, 430, 450, and 460. A difference value of a luminance profile pattern and a difference value of a luminance at a pixel "a" can be obtained according to equations (3) and (4) using luminance profile pattern values calculated at time Ti and Tk, respectively.

$$Pda^{ik} = |Pal^i - Pal^k| + |Par^i - Par^j| \quad (3)$$

$$Bda^{ik} = |Ba^i - Ba^k| \quad (4)$$

Figure 6:
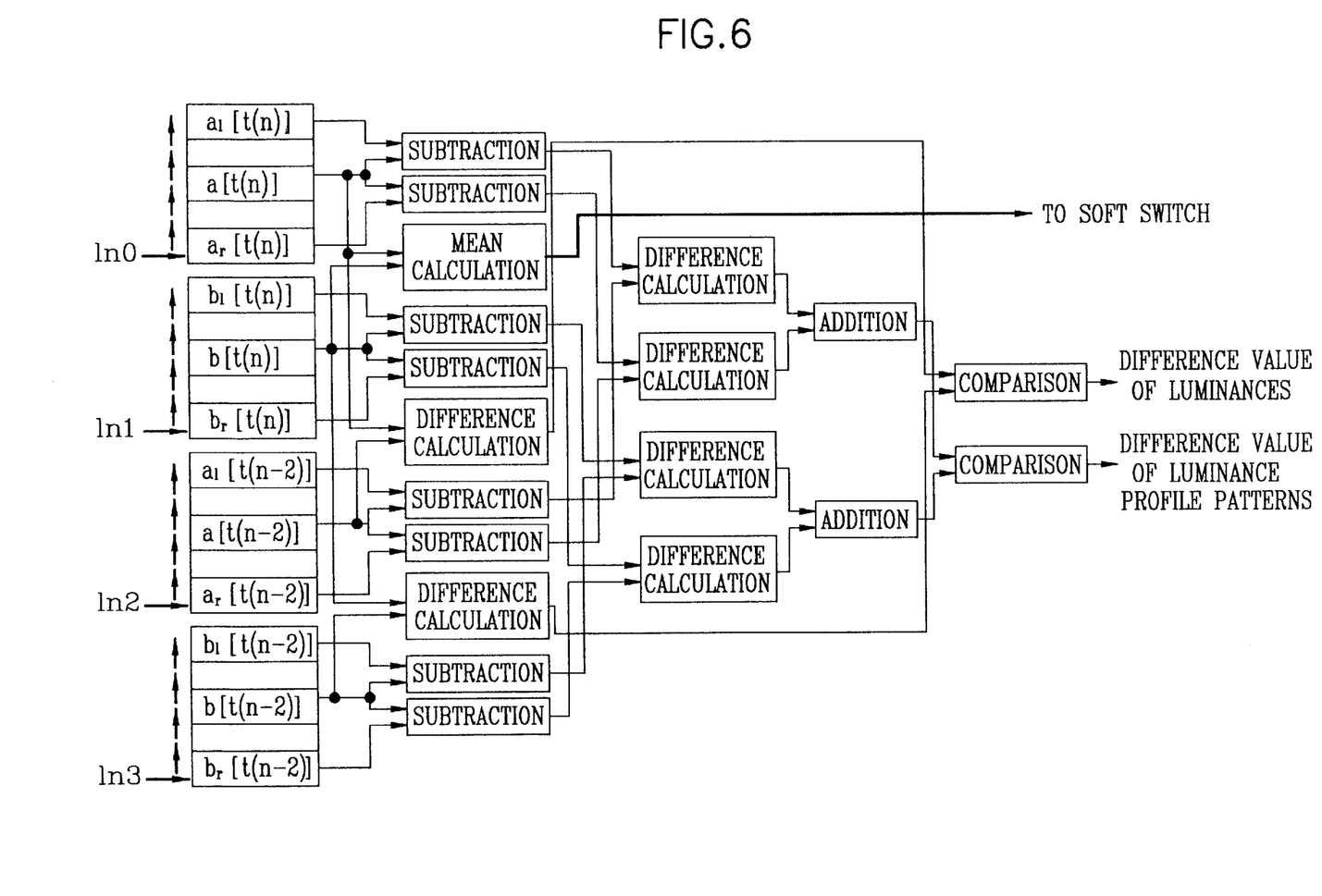

FIG. 6 illustrates a block diagram showing a system for carrying out equations (1), (2), (3), and (4).

Referring to FIG. 6, if a difference of luminance profile patterns and a difference of luminances on pixel values over many lines are obtained, pattern differences $Pda^{ik}$ and $Pdb^{ik}$ are compared and a greater value thereof is determined to be the final difference value of the luminance profile patterns, and luminance differences $Bda^{ik}$ and $Bdb^{ik}$ are compared and a greater value thereof is determined to be the final difference value of the luminances. The combiner 490 receives the difference value of the luminance profile patterns and the difference value of the luminances determined before and limits ranges of the difference values with upper threshold values and lower threshold values different from each other. The difference value of the luminance profile patterns and the difference value of the luminances limited within ranges of upper threshold values and lower threshold values different from each other are divided by m grades and mapped. A greater value of the mapped pattern difference value and the luminance difference value is provided to the median filter 500. In this instance, the threshold values are loaded externally, and therefore, the threshold values can be varied according to the application.

Noise can be included in the luminance profile pattern difference and/or the luminance difference calculated in a receiver side due to a noise entrained into a video in the process of encoding or transmission from a transmission side. The median filter 500 removes the noise and groups portions with motion in any well-known manner. As a simple example, a 9-point median filter may be embodied as a well-known bubble sort system.

Generally, there is almost no single pixel motion, but group pixel motion. Therefore, if a motion of one pixel is found, it is highly probable that the peripheral pixels are also in motion, as the motion is a motion component rather than a noise component because noise components are removed in the median filter unit 500. Accordingly, the extension unit 510 carries out a function to extend motion effects to the peripheral pixels in any well-known manner. As a simple example, a nine point maximum filter can be used. That is, in the present invention, in order to obtain an extent of motion, luminance differences and a luminance profile pattern differences are calculated, and the maximum values are respectively mapped. A greater value of the mapped values is used. In addition, the median filter 500 and the extension unit 510 obtain a more accurate extent of motion. The soft switch 520 provides a mixed value of a pixel value P(n−1, x, y) at a position to be interpolated presently in the second field data and a value from the mean filter 480. The value from the mean filter is represented by equation (5) below.

$$(P(n, x, y-1) + P(n, x, y+1))/2 \quad (5)$$

where n represents the present field, x represents the column and y represents the line of a pixel P.

That is, an output of the soft switch 520 can be expressed as equation (6) below.

$$\text{Output}(P(n, x, y)) = \alpha\{(P(n, x, y-1) + P(n, x, y+1))/2 + (1-\alpha)P(n-1, x, y) \quad (6)$$

where $\alpha$ is an extent of motion provided from the extension unit 510 and ranges from $0 \leq \alpha \leq 1$. That is, $\alpha = 0$ represents a still picture, and motion between fields is greater as $\alpha$ approaches 1. Therefore, the soft switch 520 determines an interpolation value of an interpolation pixel according to an extent of motion using merits of the non-motion compensation inter-field interpolation method and the intra-field interpolation method.

The vertical line changing unit 530 changes a number of vertical lines as required using the interpolated line data from the soft switch 520 and line data in the first field data and from the field data storage unit 410.

In general, a luminance signal has a wide frequency band while a chrominance signal has a narrow frequency band, and the human eye is sensitive to the luminance signal, but not to the chrominance signal. Therefore, in the present invention, an interpolation is conducted on the luminance signal using the aforementioned motion prediction between fields, while a linear interpolation is conducted on the chrominance signal only for the present field data in consideration of the complexity and efficiency of hardware. However, the aforementioned method may be applied, not only to a luminance signal, but also to a chrominance signal for obtaining an interpolated value of an interpolation pixel. The aforementioned method may also be applied to other kinds of video signals in the same fashion. Though the aforementioned method is explained on a horizontal direction luminance profile pattern up to now, the luminance profile pattern concept may be extended to the vertical direction.

The deinterlacing device for a digital TV receiver of the present invention has an excellent performance over the non-motion compensation inter-field interpolation method, the line doubling method, and the intra-field interpolation method, and shows a performance similar to the method suggested by Bernard (U.S. Pat. No. 5,027,201) and Faroudia (U.S. Pat. No. 5,159,451). As the device of the present invention can be embodied with simple hardware, the device of the present invention provides a good quality picture at a low cost. The present invention is applicable to a digital TV receiver which displays by progressive scanning, and to related displays.

It will be apparent to those skilled in the art that various modifications and variations can be made in the deinterlacing device and method for a digital TV receiver of the present invention without departing from the spirit or scope of the invention. Thus, it is intended that the present invention cover the modifications and variations of this invention provided they come within the scope of the appended claims and their equivalents.

What is claimed is:

1. A deinterlacing device comprising:
    a data storage unit for storing a video signal in three field data units;
    a first pattern detecting unit for detecting a pattern of a data level of at least one pixel value in a first field data of the three field data;
    a second pattern detecting unit for detecting a pattern of a data level of at least one pixel value in a third field data, a data two field prior to the first field data, corresponding to the at least one pixel value in the first field data;
    a difference signal detecting unit for obtaining a difference signal between the at least one pixel in the first field and the at least one pixel in the third field, and a difference signal between the patterns detected in the first pattern detecting unit and the second pattern detecting unit; and,
    a motion signal generating unit for obtaining a motion signal for interpolation of a second field between the first field and the third field using the difference signals detected in the difference signal detecting unit.

2. A deinterlacing device as claimed in claim 1, wherein the motion signal generating unit includes;
    a mapper for respectively mapping the difference signals, and
    a comparing unit for comparing sizes of the mapped signals and determining a motion signal according to a result of the comparison.

3. A deinterlacing device as claimed in claim 2, wherein the comparing unit provides a greater signal in the mapped signals as the motion signal.

4. A deinterlacing device as claimed in claim 1, wherein the at least one pixel value in each of the fields includes one pixel value on a line and peripheral pixels values on the same line.

5. A deinterlacing device as claimed in claim 4, wherein the peripheral pixel values are pixel values on a left and a right of the at least one pixel value.

6. A deinterlacing device as claimed in claim 1, further comprising;
    a median filter for removing noise components from the motion signal from the motion signal generating unit and grouping portions with motions; and,
    an extension unit for extending an effect of the motion of the portions grouped in the median filter to adjacent pixels.

7. A deinterlacing device as claimed in claim 1, wherein the at least one pixel value in each of the fields is on at least one line.

8. A deinterlacing device as claimed in claim 7, wherein the at least one pixel value in each of the fields includes;
    a first pixel value on a first line and pixel values around the first pixel value, and
    a second pixel value on a second line and pixel values around the second pixel value.

9. A deinterlacing device as claimed in claim 1, wherein the pixel value is a value representing a luminance of the pixel, and a pattern on a data level of the pixel value represents a luminance profile pattern.

10. A deinterlacing device comprising:
    a first luminance profile pattern detecting unit for detecting a first luminance profile pattern using a first pixel value on a first line in a first field and peripheral pixel values thereof;
    a second luminance profile pattern detecting unit for detecting a second luminance profile pattern using a first pixel value on a first line in a third field and peripheral pixel values thereof;
    a pattern difference detecting unit for detecting a pattern difference signal between the first luminance profile pattern and the second luminance profile pattern;
    a luminance difference detecting unit for detecting a luminance difference signal between a luminance of the first pixel in the first field and a luminance of the first pixel in the third field;
    a mapper for respectively mapping the pattern difference signal and the luminance difference signal; and,
    a comparing unit for providing a signal with a greater value of the two signals from the mapper as a motion signal for an interpolation pixel.

11. A deinterlacing device as claimed in claim 10, further comprising;
    a median filter for removing noise components from the motion signal from the comparing unit and grouping motion portions; and,
    an extension unit for extending the grouped motion portions to adjacent pixels.

12. A deinterlacing device as claimed in claim 10, wherein the peripheral pixel values of the first pixel value are pixel values on a left and a right of the first pixel value on the same line.

13. A deinterlacing device comprising:
    a first pattern detecting unit for detecting a first luminance profile pattern using a first pixel value on a first line in a first field and peripheral pixel values of the first pixel value;
    a second pattern detecting unit for detecting a second luminance profile pattern using a first pixel value on a first line in a third field and peripheral pixel values of the first pixel value;
    a first pattern difference detecting unit for detecting a pattern difference signal between the first luminance profile pattern and the second luminance profile pattern detected in the first pattern detecting unit and the second pattern detecting unit;
    a third pattern detecting unit for detecting a third luminance profile pattern using a first pixel value on a second line in the first field and peripheral pixel values of the first pixel value;
    a fourth pattern detecting unit for detecting a fourth luminance profile pattern using a first pixel value on a second line in a third field and peripheral pixel values of the first pixel value;
    a second pattern difference detecting unit for detecting a pattern difference signal between the third luminance profile pattern and the fourth luminance profile pattern;
    a first comparing unit for comparing signals from the first pattern difference detecting unit and the second pattern difference detecting unit and providing a greater value;
    a first luminance difference detecting unit for detecting a difference of luminances of the first pixel values on the first lines in the first field and the third field;
    a second luminance difference detecting unit for detecting a difference of luminances of the second pixel values on the second lines in the first field and the second field;

a second comparing unit for comparing signals from the first luminance difference detecting unit and the second luminance difference detecting unit and providing a greater value;

a mapper for respectively mapping the signals from the first comparing unit and the second comparing unit; and, a third comparing unit for providing a signal with a greater value of the two signals from the mapper as a motion extent signal.

14. A deinterlacing device as claimed in claim 13, wherein the peripheral pixel values are pixel values on a left and a right of respective pixel value.

15. A deinterlacing device as claimed in claim 13, further comprising;

a median filter for removing noise components from the motion extent signal from the third comparing unit and grouping motion portions; and, an extension unit for extending the grouped motion portions to adjacent pixels.

16. A deinterlacing device comprising:

a data storage unit for storing a video signal in three successive field data units;

a first pattern and luminance detecting unit for detecting a first luminance profile pattern and a luminance signal from a second line data one line prior to a first line data in a first field presently provided from the data storage unit;

a second pattern and luminance detecting unit for receiving a second line data in the third field data which is two field prior to the first field data and has a spatial position identical to the second line data in the first field data from the data storage unit and detecting a second luminance profile pattern and a luminance signal from the received line data;

a first difference signal detecting unit for obtaining a first difference signal of the first luminance profile pattern and the luminance and the second luminance profile pattern and the luminance;

a third pattern and luminance detecting unit for receiving a first line data in the present first field data from the data storage unit ;and detecting a third luminance profile pattern and a luminance from the line data;

a fourth pattern and luminance detecting unit for receiving a first line data in the third field data having a spatial position identical to a first line data in the first field and two field prior to the present field from the data storage unit and detecting a fourth luminance profile pattern and a luminance from the line data;

a second difference signal detecting unit for obtaining a second difference signal of the third luminance profile pattern and the luminance and the fourth luminance profile pattern and the luminance;

a mean filter for providing a mean of a pixel value at a position to be interpolated presently in the second field data which is a field data right prior to the present field data from the data storage unit and pixel values at positions both on an upper side and lower side of the pixel value at the position to be interpolated presently in the first field data which is the present field data;

a combiner for selecting and forwarding greater values of the signals from the first difference signal detecting unit and the second difference signal detecting unit, respectively;

a median filter for removing noise from a signal from the combiner and grouping motion portions;

an extension unit for extending the grouped extension portions to adjacent pixels;

a soft switch for mixing the pixel value of a line data to be interpolated in the second field data from the data storage unit and a value from the mean filter; and, a vertical line changing unit for changing a number of vertical lines using the first line data in the present first field data from the data storage unit and the interpolated line data from the soft switch.

17. A deinterlacing device as claimed in claim 16, wherein the data storage unit includes a plurality of memories for storing at least one line data.

18. A digital TV receiver comprising:

an antenna;

a tuner for synchronizing to a desired channel of channels received at the antenna;

an intermediate frequency signal generating unit for obtaining an intermediate frequency video signal of the synchronized channel;

a data storage unit for storing the video signal in units of three field data;

a first pattern generating unit for obtaining a first pattern of a data level of at least one pixel value in a first field data of the three field data;

a second pattern generating unit for obtaining a second pattern of a data level of at least one pixel value in a third field data, a data two field prior to the first field data, corresponding to the at least one pixel value in the first field data;

a difference signal detecting unit for obtaining a difference signal between the at least one pixel in the first field and the at least one pixel in the third field, and a difference signal between the first pattern and the second pattern; and, a motion signal generating unit for generating a motion signal for use in an using the difference signals.

19. A digital TV receiver as claimed in claim 18, further comprising:

a medial filter for removing noise components from the motion signal and grouping motion portions; and, an extension unit for extending the grouped motion portions in the median filter to adjacent pixels.

20. A deinterlacing method for a digital TV receiver, comprising the steps of:

(1) storing a first field data received presently through a memory, a second field data which is one field prior to the first field, and a third field data which is two fields prior to the first field;

(2) detecting a first pattern of a data level of at least one pixel value in the first field data received presently;

(3) detecting a second pattern of a data level of at least one pixel value in the third field data which is two fields prior to the first field data corresponding to the at least one pixel value in the first field data;

(4) obtaining a difference signal between the at least one pixel values in the first filed data and the third field data, and a difference signal between the first pattern and the second pattern; and, (5) obtaining a motion signal for use in an interpolation using the obtained difference signals.

21. A deinterlacing method as claimed in claim 20, wherein the step (5) includes the steps of;

respectively mapping the difference signal on pixel values and the difference signal on patterns, and comparing sizes of the mapped values and determining a signal with a greater value as a motion signal according to a result of the comparison.

22. A deinterlacing method as claimed in claim 20, further comprising the steps of:

removing noise components from the motion signal and grouping potions with motions; and, extending the grouped motion portions, to adjacent pixels.

23. A deinterlacing method as claimed in claim 20, wherein the at least one pixel value exists on one line.

24. A deinterlacing method as claimed in claim 20, wherein the at least one pixel value includes;

a pixel value on one line and pixel values on left and right of the pixel value on the same line.

25. A deinterlacing method as claimed in claim 20, wherein the at least one pixel value exists extended over two lines.

26. A deinterlacing method as claimed in claim 20, wherein the at least one pixel value includes;

a pixel value on one line, and respective pixel values above and below the pixel value on lines different from the pixel value.

27. A deinterlacing method as claimed in claim 20, wherein the pattern is a luminance profile pattern of the at least one pixel value.

* * * * *